United States Patent
Wickham

[11] 3,966,272
[45] June 29, 1976

[54] RAIL VEHICLE BRAKING SYSTEM WITH IMPROVED BRAKE SIGNAL PROPAGATION

[75] Inventor: David John Wickham, London, England

[73] Assignee: Westinghouse Brake & Signal Company Limited, Chippenham, England

[22] Filed: Oct. 9, 1974

[21] Appl. No.: 513,398

[30] Foreign Application Priority Data
Oct. 13, 1973  United Kingdom............... 47918/73

[52] U.S. Cl..................................... 303/81; 303/86
[51] Int. Cl.²............................................ B60T 11/28
[58] Field of Search .................. 303/81, 82, 86, 68, 303/69; 188/153 R

[56] References Cited
UNITED STATES PATENTS

| | | |
|---|---|---|
| 1,969,812 | 8/1934 | McCune ................................ 303/82 |
| 1,993,940 | 3/1935 | Moller et al. ......................... 303/82 |
| 3,180,695 | 4/1965 | McClure ............................. 303/82 X |
| 3,232,677 | 2/1966 | Wilson et al. ..................... 303/81 X |
| 3,716,276 | 2/1973 | Wilson et al. .......................... 303/82 |

Primary Examiner—Duane A. Reger
Assistant Examiner—Douglas C. Butler
Attorney, Agent, or Firm—Larson, Taylor & Hinds

[57] ABSTRACT

A train braking system is provided which operates conventionally to effect braking by a reduction of pressure in a brake pipe and which includes on a car of the train a fluid flow sensor operating in response to a pressure gradient due to flow over a length of the brake pipe in the car or over an interposed restriction in the brake pipe, the fluid flow sensor being sensitive to such flow to operate a valve via which fluid is permitted to be applied to or removed from the brake pipe ahead of the restriction or brake pipe section having regard to the direction of propagation to tend to enhance a pressure change being caused by the flow.

8 Claims, 1 Drawing Figure

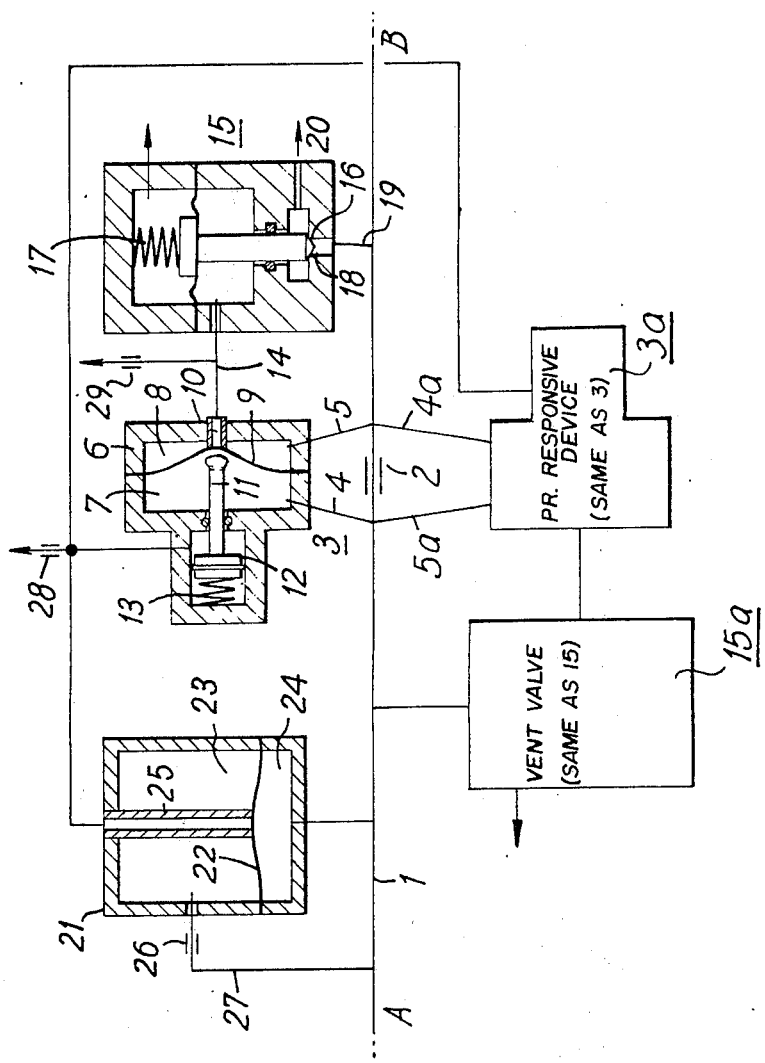

RAIL VEHICLE BRAKING SYSTEM WITH IMPROVED BRAKE SIGNAL PROPAGATION

FIELD OF THE INVENTION

This invention relates to rail vehicle braking systems and relates especially to improvements to such systems as applied to a train of vehicles.

BACKGROUND AND SUMMARY

In rail vehicle braking systems it has become established practice to employ air under pressure in a brake pipe running the length of a train as the control means whereby brakes are applied and released. More specifically, it has been preferable to establish a system pressure, a decrease in which pressure in the brake pipe gives rise to a brake application, and a subsequent recovery of which permits the release of the brakes.

The use of air under pressure for control of the brakes in the above manner has certain shortcomings in a long train because not only can the rate of propagation of a pressure signal be no greater than the speed of sound but more significantly, where the system relies upon a reduction of brake pipe pressure by passing air from one end of the train to another through the brake pipe, the resistance to such flow of air through the brake pipe can introduce substantial delays between the operation of the brakes on spaced vehicles of the train. The present invention seeks to advantageously reduce the above more significant shortcoming.

According to the present invention there is provided in a rail vehicle braking system an arrangement for improving brake signal propagation in a brake pipe, the arrangement including a valve and a fluid flow sensor connected into a section of a brake pipe and to be responsive to flow rate in the brake pipe, said valve being responsive to the flow sensor to effect enhancement of a brake pipe pressure change produced by flow therein. The arrangement preferably is constructed so as to effect the enhancement only upon the occurrence of a predetermined pressure change to be propagated in the pipe, so as to render the arrangement non-responsive to pressure changes of other than a predetermined sense and to steady pressure gradients and flow as might be caused by a leak in the system, thus responding only to predetermined changing pressures in the brake pipe.

In a braking system, one or more said arrangements may be included at the points based along the brake pipe of a train from a brake pipe control valve and thereby reduce delays in response of the brakes along the train.

BRIEF DESCRIPTION OF DRAWING

In order that the invention may be more clearly understood and readily carried into effect, the same will be further described by way of example with reference to the accompanying drawing which illustrates in schematic form a relevant part of a brake system utilising the invention.

DESCRIPTION OF PREFERRED EMBODIMENTS

Referring to the drawing, a heavy conduit denoted by the reference 1 represents a portion of the brake pipe of a train, being a portion which is provided on one vehicle of a train. Connected into this portion of the brake pipe between the points A and B there is provided a restriction denoted by the reference 2 which is sufficient to provide a perceptible pressure drop when a reduction of brake pipe pressure is effected such as to give rise to an appreciable flow of air between the points A and B. This perceptible pressure drop is such as to be responded to by a pressure sensitive device 3, to which connections 4 and 5 are made to either side of the restriction 2. The pressure sensitive device 3 essentially comprises a main body 6 which is divided into two chambers 7 and 8 by means of a flexible diaphragm 9. This diaphragm 9 is such that when the pressure in the chamber 7 exceeds that in the chamber 8, it bears against an orifice 10 to close the orifice in the manner of a valve thereby preventing the flow of fluid from the chamber 8 to an output conduit connected to the orifice 10. For reasons to be referred to hereafter, the pressure sensitive device 3 also includes a piston operable plunger 11, operation of which is effective to maintain the diaphragm in a position in which it maintains the orifice 10 closed. The piston is denoted by the reference 12 and this is provided with a light spring such that in the absence of applied pressures, the plunger 11 is urged against the diaphragm. Output pressure derived from the orifice 10 is applied via a conduit 14 and a choke 29 to atmosphere and also to a control input of a vent valve 15. The vent valve is of conventional construction and merely comprises a spring loaded diaphragm operable valve member 16 which is normally urged by its spring 17 into the closed position against a valve seat 18. The valve seat 18 communicates with the brake pipe via a conduit 19 and the other side of the valve seat communicates with atmosphere via a conduit 20. The vent valve is thus such that on application of a suitable pressure via the conduit 14, the vent valve opens to provide communication via conduits 19 and 20 to atmosphere thereby venting the brake pipe for as long as the necessary pressure exists at the conduit 14. A further pressure responsive device is denoted by the outline 3a and a further vent valve is denoted by the outline 15a and it will be noted that whilst the pressure responsive device 3a is connected across the restriction 2 in a manner similar to the device 3, the vent valve 15a is connected on the other side of the restriction 2 as compared to the vent valve 15.

One further unit is shown in the drawing and this comprises a device 21 which in operation inhibits the operation of either of the vent valves 15 and 15a in the event of the existence of rising pressure in the brake pipe, or in the event of steady flow or pressure gradients, i.e., when pipe pressure is not actually changing. This latter device 21 comprises a diaphragm 22 separating two chambers 23 and 24, the former of which communicates via a tube 25 with the front of the piston of each of the pressure responsive devices 3 abd 3a. The chamber 23 also communicates via a choke and suitable conduit with the brake pipe. The other chamber 24 of the device 21 communicates via suitable conduit also with the brake pipe.

Whilst in the foregoing a restriction 2 is actually inserted in the brake pipe, it is to be understood that by making the connections between more widely spaced points in the brake pipe sufficient pressure drop may be able to be sensed due to flow in the brake pipe without the provision of the actual restriction and the operation now to be described should be taken having this in mind.

In operation of the apparatus as shown in the drawing, it will be assumed that the locomotive from which the brakes are to be controlled is connected to the section of brake pipe which joins the section AB at the point A. That is, the locomotive is to be left. With a steady system brake pipe pressure in the brake pipe 1, the various parts of the arrangement are in the position shown and the vent valve 16 is closed against its seat 18. Similarly the vent valve 15a is also closed. This is because no signal pressure is available from either of the pressure responsive devices beneath the diaphragms of the respective vent valves. On a reduction of brake pipe pressure occurring such as is required to call for a brake application, due to the action of 21 piston 12 is displaced to the left to withdraw plunger 11. The flow of air which commences to occur in a direction from the point B to the point A, gives rise to a pressure drop across the restriction 2 which is provided in the brake pipe. When this occurs the diaphragm 9 of the pressure responsive device 3 is deflected allowing some venting of the brake pipe via conduit 5 chamber 8, orifice 10 or conduit 14 and leakage choke 29 to atmosphere and a pressure signal is applied via 10 beneath the diaphragm of the vent valve 15. This causes a deflection of the diaphragm of the vent valve 15 such as to lift the valve 16 off its seat 18 thereby effecting venting of the brake pipe via the conduits 19 and 20. In this manner, enhancement of a brake pipe reduction is effected at the point at which the apparatus is provided. This continues until a time is reached a short time afterwards when the pressure drop which occurs across the restriction 2 is insufficient to keep the orifice 10 open to sustain a signal in the conduit 14 to the vent valve and the vent valve 15 again closes. The further pressure responsive device 3a and the further vent valve 15a are provided in order that the arrangement may operate equally regardless of whether the locomotive carrying the driver's brake control valve is connected via the section of brake pipe which is adjacent the point B or the section of brake which is adjacent the point A as described above. The system is thereby entirely reversible.

In order to inhibit operation of both pressure responsive devices in response to increasing brake pipe pressure the device 21 is provided responsive to an increase of brake pipe pressure to urge the diaphragm 22 against the opening in the lower end of the tube 25. This happens for only such pressure changes because of the existence of the choke 26 in the conduit 27 which connects the brake pipe to the chamber 23. With such rise in brake pipe pressure the spring 13 is effective on the piston 12 to urge the plunger 11 against the diaphragm 9 thereby rendering the pressure responsive device 3 unresponsive to a pressure differential across the restriction 2. Similar comments also apply to the pressure responsive device 3a for increasing brake pipe pressure. This effect is the same for both the pressure responsive devices 3 and 3a regardless of from whichever of the ends B and A the increase of pressure is eminating.

Whilst not shown in the arrangement shown in the drawing, the apparatus may be provided with means, not for preventing operation of the vent valve when the brake pipe pressure is rising, but where the restriction 2 is an actual inserted restriction, for effectively removing this restriction. It may be desirable to remove the restriction for the reason that the pressure gradient along the brake pipe as a result of a pressure rise may otherwise be too great. Assuming a sufficiently rapid response to a pressure increase removal of the restriction in response thereto could inherently prevent operation of the vent valve.

Again, in an alternative arrangement it may be arranged for the restriction to be included in a control valve device by means of which the restriction is inserted only when a reducing brake pipe pressure is sensed by such means. The above mentioned consideration of the pressure gradient for a rising brake pipe pressure is thus dealt with. Further, by providing for such insertion of the restriction only during falling brake pipe conditions, it may again be found superfluous to include also the inhibition feature afforded by the spring 13, piston 12 and rod 11 of the arrangement described, for in the absence of falling brake pipe the restriction 2 will be absent and the sensing valve will not be operated.

As foreshadowed above, whilst the provision of a built-in or switched-in restriction into the brake pipe is proposed at a given point in a brake pipe, with a car of sufficient length, the fluid flow sensor may be connected to points sufficiently spaced along the brake pipe to produce a perceptible signal without an introduced additional restriction. In such an event the above alternatives whereby the restriction is introduced only by changing pressure would not of course apply.

In the event that the invention is to be applied to an arrangement for reducing the pipe gradient for an increasing brake pipe pressure along a train pipe, the valve may be a valve which operates to connect a source of air such as a reservoir or a further supply pipe to the brake pipe.

By providing for the use of the invention to be responsive to flow due to a pressure gradient existing in either direction along the train and the provision of vent valves and recharging valves the invention can be arranged to reduce the pressure gradient due either to rising brake pipe pressure or falling brake pipe pressure. Clearly in such a case such suitable means as is necessary will be included to prevent venting during recharging or recharging during venting.

It will be understood further that whilst the arrangement described as applied to a train braking system may be provided on each vehicle of a train, it may be by no means necessary to do this. By providing it at suitably much wider spaced intervals along a train, the undesired pressure gradients will readily be reduced. Accordingly, by providing sufficient such arrangements in a long train, even failure of one or more such arrangements will not substantially affect the efficiency or response time of the train braking system.

In a system where many such arrangements are included, say one per car, it may be possible to reduce the cost of each arrangement by not using the relay valves. This is because where venting or boosting occurs at each car, sufficient air may be transmitted into or out of the brake pipe via the sensing device. Thus in the above described embodiment sufficient venting for the length of pipe included in the one car may be obtained via the leak choke 29 without the relay valve 15, if the leak choke is made sufficiently large.

Having thus described our invention what I claim is:

1. In a rail vehicle braking system having a brake pipe through which fluid signals are propagated for control of brakes of the vehicle, an arrangement for improving signal propagation in the brake pipe, comprising valve means connected with said brake pipe and operable when actuated to effect enhancement of a predetermined brake pipe pressure change produced by flow in the brake pipe, fluid flow sensor means connected with said brake pipe for controlling said valve means to effect said enhancement in response to sensed fluid flow rate in said brake pipe, and override means responsive to fluid conditions in said pipe for inhibiting operation of said arrangement except upon the occurrence of a predetermined pressure change to be propagated in said pipe, so as to render said arrangement nonresponsive to pressure changes of other than a predetermined sense and to steady pressure gradients and flow as might be caused by a leak in said system, said override means comprising a pressure change detector in the form of a pressure sensitive member subjected on opposing faces to fluid conditions in said pipe, and delay means for delaying changes of fluid conditions on one face relative to the other face upon a pressure change in said pipe.

2. Apparatus as claimed in claim 1 wherein said flow sensor means tends to generate a valve actuation signal in response to pressure gradients in said pipe, and said override means permits passage of an actuation signal to said valve means only upon sensing a pressure change of a predetermined sense in said pipe.

3. Apparatus as claimed in claim 1 wherein said fluid flow sensor means is operative to control said valve means in response to sensed fluid flow in either direction.

4. Apparatus as claimed in claim 3 wherein said fluid flow sensor means comprises first and second fluid flow sensors for sensing flow in respective directions.

5. Apparatus as claimed in claim 1 wherein said fluid flow sensor means comprises means for sensing pressure gradients caused by flow in said brake pipe.

6. In a rail vehicle braking system having a brake pipe through which fluid signals are propagated for control of brakes of the vehicles, an arrangement for improving signal propagation in the brake pipe, comprising valve means connected with said brake pipe and operable when actuated to effect enhancement of a predetermined brake pipe pressure change produced by flow in the brake pipe, fluid flow sensor means connected with said brake pipe for controlling said valve means to effect said enhancement in response to sensed fluid flow rate in said brake pipe, and override means responsive to fluid conditions in said pipe for inhibiting operation of said arrangement except upon the occurrence of a predetermined pressure change to be propagated in said pipe, so as to render said arrangement nonresponsive to pressure changes of other than a predetermined sense and to steady pressure gradients and flow as might be caused by a leak in said system, said fluid flow sensor means comprising means for comparing pressures at plural points on said brake pipe and actuating said valve means in response to the compared pressures indicative of fluid flow, and said override means comprising means for sensing fluid conditions in said brake pipe and permitting actuation of said valve means only upon sensing changing pipe pressure of said predetermined sense.

7. Apparatus as claimed in claim 6 wherein said override means comprises a pressure change detector in the form of a pressure sensitive member subjected on opposing faces to fluid conditions in said pipe, and delay means for delaying changes of fluid condition on one face relative to the other face.

8. Apparatus as claimed in claim 7 further comprising an inhibitor member responsive to the position of said pressure sensitive member for selectively inhibiting or permitting actuation of said valve means dependent upon the position of said pressure sensitive member, said pressure sensitive member being so constructed and arranged as to occupy a position in which said inhibitor member inhibits actuation of said valve means when pipe pressure is changing in other than said predetermined sense and when the pressure difference on the opposing faces of said pressure sensitive member is less than a predetermined difference indicative of substantially steady pressure conditions regardless of flow rate.

* * * * *